(12) United States Patent
Wingren

(10) Patent No.: US 6,735,444 B2
(45) Date of Patent: May 11, 2004

(54) METHOD AND SYSTEM FOR LOCATING A DEVICE USING A LOCAL WIRELESS LINK

(75) Inventor: Gustav Wingren, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 579 days.

(21) Appl. No.: 09/746,971

(22) Filed: Dec. 21, 2000

(65) Prior Publication Data

US 2002/0081970 A1 Jun. 27, 2002

(51) Int. Cl.⁷ ................................................. H04Q 7/20
(52) U.S. Cl. ................................... 455/456.1; 455/41.2
(58) Field of Search .......................... 455/456.1, 456.2, 455/456.3, 456.5, 456.6, 41.1, 41.2; 342/457, 463, 465; 340/539.13, 539.32

(56) References Cited

U.S. PATENT DOCUMENTS

| | | | |
|---|---|---|---|
| 5,485,163 A | * 1/1996 | Singer et al. | 342/457 |
| 5,818,346 A | 10/1998 | Goodwin, III et al. | 340/825.49 |
| 5,850,609 A | * 12/1998 | Sugarbroad et al. | 455/456.1 |
| 5,983,109 A | * 11/1999 | Montoya | 455/456.2 |
| 6,131,067 A | * 10/2000 | Girerd et al. | 701/213 |
| 6,415,155 B1 | * 7/2002 | Koshima et al. | 455/456.1 |
| 6,480,374 B1 | * 11/2002 | Lee | 361/681 |
| 6,512,754 B2 | * 1/2003 | Feder et al. | 370/338 |

FOREIGN PATENT DOCUMENTS

| | | |
|---|---|---|
| EP | 0790 596 A2 | 8/1997 |
| WO | WO 98/00988 | 1/1998 |
| WO | WO 99/46899 | 9/1999 |
| WO | WO 01/47181 A2 | 6/2001 |

OTHER PUBLICATIONS

A Routing Vector Method (RVM) for Routing in Bluetooth Scatternets by Pravain Bhagwat et al.; XP–002137402; pp. 375–379.
Standard Search Report for RS106277US dated Jul. 31, 2001; completed on Jul. 27, 2001.

* cited by examiner

Primary Examiner—Lee Nguyen
Assistant Examiner—Minh D. Dao
(74) Attorney, Agent, or Firm—Jenkens & Gilchrist, P.C.

(57) ABSTRACT

A system and method for locating objects uses a wireless communication interface for performing searches for specified objects. Initially, a location request for a specified device is transmitted via a local wireless interface, such as a Bluetooth™ radio interface, by a request origination device. A separate device receives the location request, either directly or via one or more other devices that use the local wireless interface, and forwards the location request via the local wireless interface. When the separate device receives a response to the forwarded location request from the specified device, the separate device sends a message to the request origination device that includes information relating to a location of the specified device.

1 Claim, 2 Drawing Sheets

METHOD AND SYSTEM FOR LOCATING A DEVICE USING A LOCAL WIRELESS LINK

BACKGROUND OF THE INVENTION

1. Technical Field of the Invention

The present invention relates to wireless communications systems, and in particular to wireless communications among devices in a local area.

2. Description of Related Art

When a person misplaces an object or device, he or she frequently has to spend a significant amount of time looking for the object or device. For example, a person might have to walk around the house looking for misplaced car keys, walk around the office looking for a lost cell phone, or wander around the airport looking for lost luggage. Not only can such a search be time consuming, trying to locate an item or remember where the item was left can also be quite frustrating and tiresome. As the number of portable devices that a person owns and must keep track of increases, the inconvenience of having to search for misplaced items is only likely to increase.

There are currently systems that can be used to assist in locating misplaced devices. For example, some cordless telephones have a "page" feature that causes the cordless telephone to ring when it is paged by the cordless telephone base station. In addition, systems exist in which an approximate location of a device can be determined from signals received from that device at one or more of a network of antennas. Such systems, however, can be limited by the range of transmission, typically only exist for a very small number of types of devices, and frequently require special hardware for use in the search process.

There is a need, therefore, for a system and method for conveniently and efficiently locating objects and devices. Preferably, such a locating procedure could be performed without requiring significant amounts of hardware that is specifically designed for the search procedure.

SUMMARY OF THE INVENTION

The present invention comprises a method and system for locating objects using wireless communications. In particular, a requesting device utilizes other devices in the vicinity to forward a location request from one device to another until a specified device is located, if possible. The system includes a request origination device for transmitting a location request for the specified device. The location request is transmitted via a local wireless link. The system further includes a request forwarding device that receives the location request and forwards the location request via the local wireless link. If the request forwarding device receives a response to the forwarded location request from the specified device, then it sends a message to the request origination device that includes information relating to a location of the specified device.

In accordance with another embodiment of the invention, a search request for a specified device is transmitted via a local wireless interface by a first device. The search request is received at a second device and is forwarded via the local wireless interface. A response to the forwarded search request is received from the specified device, and information relating to a location of the specified device, which information is based on the received response, is sent to the first device.

In accordance with another embodiment, a search request for a specified device is transmitted via a local wireless interface by a first device. The search request is received at a second device and is forwarded via the local wireless interface to a new separate device. It is then determined if the separate device comprises the specified device. If so, the first device is notified that the specified device has been located. If, however, the separate device does not comprise the specified device and if the search request has already been forwarded at least a predetermined number of times, the first device is notified that the search failed. Otherwise, the steps of forwarding the search request and determining if the separate device comprises the specified device are repeated until either the specified device is located or it is determined that the search request has already been forwarded at least said predetermined number of times.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
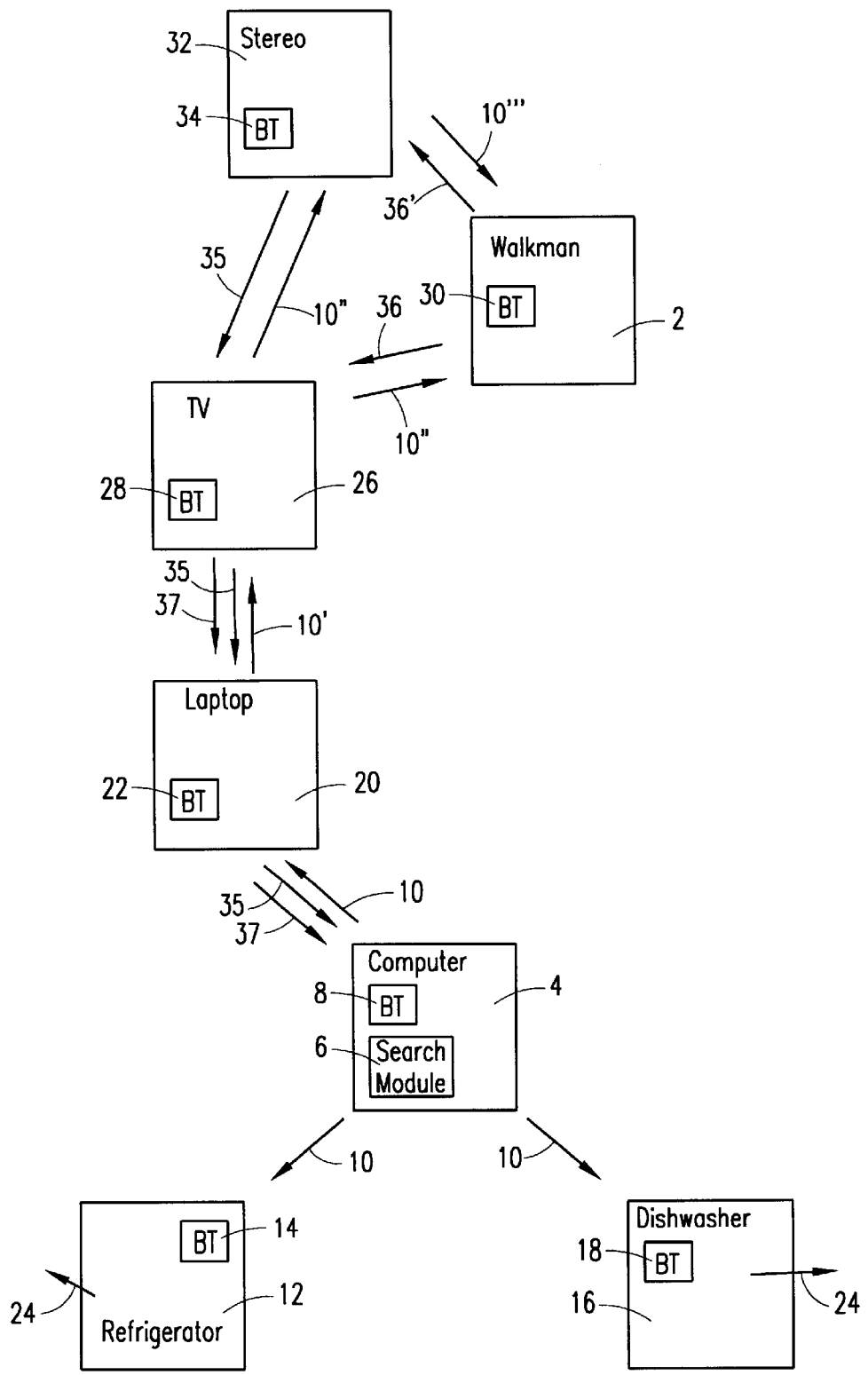
FIG. 1 is a schematic diagram illustrating a hypothetical example of a Bluetooth™ search procedure in accordance with the present invention.

In the near future, Bluetooth™ transceivers will be built into many different types of devices, such as phones, computers, refrigerators, vehicles, stereos, and many other types of objects and electronic devices. In accordance with the present invention, devices and objects that include a Bluetooth™ transceiver can be used to help persons find their lost belongings. Although the preferred embodiment utilizes Bluetooth™ wireless technology, the present invention is not limited to the use of Bluetooth™ technology. Instead, other types of local wireless links, such as other types of radio links or infrared communications, can also be used.

Pursuant to the present invention, in response to certain user input, a program on the user's computer or other electronic device can instruct a Bluetooth™ device contained within the computer or other electronic device to attempt to contact other Bluetooth™ devices in the same general vicinity in an effort to locate a particular device. Although the computer or other electronic device might succeed in contacting other Bluetooth™-equipped devices, such other devices might not include the particular device being sought. If not, the software in the computer or other electronic device can then instruct the other Bluetooth™-equipped devices to forward a search request to other devices, thereby continuing the search, until at least one of the devices in the chain locates the sought-after device. Each of the other devices that succeed in locating the device of interest then reports back to the computer or other electronic device that initiated the search, and the area where the device being sought is located can be substantially narrowed down.

In cases where the search is being conducted in an area that has a number of immobile Bluetooth™ devices, the physical location of the Bluetooth™ device that successfully located the device being sought might be known. Accordingly, the area where the device is located could be presented on a map (e.g., that is displayed on a computer display screen) based on the known locations of the immobile Bluetooth™ devices. In other cases, the results of the search might simply include a list of the device or devices that found the lost item. Accordingly, the user would know that the device being sought is near a specific device or devices whose locations might be known to the user. In another alternative, the user could be informed of a direction of the device relative to one or more other devices, whose locations might or might not be known by the computer or other electronic device that initiates the search.

In situations where more than one Bluetooth™ device found the lost item, the position of the lost item can be pinpointed more precisely. For example, the Bluetooth™ devices might be known to have a range of approximately ten meters. Accordingly, when a Bluetooth™ device locates the lost item, it would be known that the lost item is within a circle having a ten meter radius and that is centered at the Bluetooth™ device that successfully located the lost item. As an additional alternative, a position of the device being sought can more accurately be determined using a reported signal strength measurement from which a distance between the lost device and the locating device can be estimated. Furthermore, if more than one device successfully locates the device being sought, the computer or other electronic device could calculate an even more exact location of the misplaced device using the reported signal strength measurements.

Referring now to FIG. 1, there is shown a schematic diagram illustrating a hypothetical example of a Bluetooth™ search procedure in accordance with the present invention. In this example, it is assumed that a user has lost his Walkman™ 2. As the result, the user initiates a Bluetooth™ search program on a computer 4. For purposes of illustrating the invention, the computer 4 is shown as including a Bluetooth™ search module 6 for storing the search program. Preferably, however, the program code for performing the Bluetooth™ search is stored on a computer hard disk. Pursuant to the Bluetooth™ search program, the computer 4 transmits a message (as indicated at 10) via a Bluetooth™ radio interface using a built-in Bluetooth™ transceiver 8. The message 10 includes an indication that a search is being performed for a specific device that is associated with a particular Bluetooth™ identity number, for example, and an instruction to other Bluetooth™ devices that receive the message 10 to forward the message 10 to still other Bluetooth™ devices, if possible. In addition, the message includes a counter, which is set to an initial value (e.g., zero), for identifying the number of devices that have forwarded the request and a parameter indicating the path via which the request has been forwarded. As will be appreciated, this latter parameter, in the initial message, will simply identify the request originating device.

In this example, it is assumed that the initial message 10 is received by a refrigerator 12, a dishwasher 16, and a laptop computer 20 using their respective built-in Bluetooth™ transceivers 14, 18, and 22. Each of the refrigerator 12 and the dishwasher 16 modifies the message 10 by incrementing the counter and revising the path parameter to indicate that the request has been forwarded via the refrigerator 12 and the dishwasher 16, respectively. Each of the refrigerator 12 and the dishwasher 16 then forwards the modified message (as indicated at 24) via the Bluetooth™ radio interface in an attempt to find additional devices that did not receive the initial message 10 from the computer 4. In this example, neither the refrigerator 12 nor the dishwasher 16 are able to locate any new devices. The message 10 is also modified by the laptop computer 20 to increment the counter and revise the path parameter. The modified message 10' is then forwarded (as indicated at 10') and is received by a Bluetooth™ transceiver 28 that is built into a television 26. Again, the message 10' fails to locate the Walkman™ 2. Instead, the television 26 further modifies the message to increment the counter and to update the path parameter (to indicate that the request has traveled from the computer 4, via the laptop 20, and to the television 26) and forwards the message (as indicated at 10") via the Bluetooth™ radio interface. This time the forwarded message 10" is received by the respective Bluetooth™ transceivers 30 and 34 of a stereo 32 and the Walkman™ 2.

The stereo 32 again modifies and forwards the message (as indicated at 10''') via the Bluetooth™ radio interface. The modification again includes incrementing the counter and updating the path parameter (this time to indicate that the request has traveled from the computer 4, via the laptop 20 and television 26, and to the stereo 32). Because the Walkman™ 2 is also located near the stereo 32, the message 10''' from the stereo 32 is also received by the Walkman™ 2. Based on the respective messages 10" and 10''' from the television 26 and the stereo 32, the Walkman™ 2 is able to determine that it matches the description of the device being sought based on profile information and/or on a Bluetooth™ identity number included within the messages 10" and 10'''. Accordingly, the Walkman™ 2 sends response messages 36 and 36' to each of the television 26 and the stereo 32. These response messages 36 and 36' are processed by the stereo 32 and the television 26 to generate location messages 35 and 37, respectively, which each identify the entire path taken by the successful request. These location messages 35 and 37 are then forwarded, without modification, back up the chain of devices 20 and 26 to the computer 4.

By identifying the television 26 and the stereo 32 that successfully located the Walkman™ 2, the location of the Walkman™ 2 can be determined. In a basic implementation, the user might be informed that the Walkman™ is located near the television 26 and/or the stereo 32 or is located near known positions of the television 26 and/or stereo 32. It will be appreciated, however, that other information can be included in the location messages 35 and 37 that allow the computer 4 to generate location data. In addition, the location messages 35 and 37 can further identify all of the devices in the chain.

In this example, because the Walkman™ 2 was located by both the television 26 and the stereo 32, the software contained in the search module 6 of the computer 4 can more precisely determine a location of the Walkman™ 2. Accordingly, the computer 4 can more accurately direct the user to an area where the Walkman™ 2 is located. For example, if the transmission range of the Bluetooth™ transceiver 30 in the Walkman™ 2 is known to be approximately ten meters, then it can be determined that the Walkman™ 2 is within ten meters of the stereo 32 and the television 26. Moreover, if the stereo 32 and the television 26 are separated by some distance, the overlap of an area within a ten meter radius of the stereo 32 and an area within a ten meter radius of the television 26 can be determined, and thus the location of the Walkman™ 2 can be narrowed down. To obtain even more accurate positional information, a strength of the signal received from the Walkman™ 2 at each of the television 26 and the stereo 32 can be used to further narrow down the location of the Walkman™ 2.

It will be recognized that the accuracy of the determined location can be limited by the number of Bluetooth™ devices that are able to locate the misplaced device, by whether the positions of the locating devices are known, and/or by the processing capabilities of the software that controls the various Bluetooth™ devices. Thus, in some cases this procedure may result in a triangulation of a substantially precise location of the misplaced device, while in other situations and/or embodiments the search procedure may result only in the ability to identify a direction in which the misplaced device is located.

As will be appreciated, the search area for the Bluetooth™ search is defined by the number of, and the distance to, other Bluetooth™ devices in the area. Moreover, in addition to using the invention as a tool for searching for misplaced Bluetooth™-equipped devices, the invention can also be used to constantly monitor moving devices that include Bluetooth™ transceivers, such as shopping carts or airport vehicles.

Figure 2:
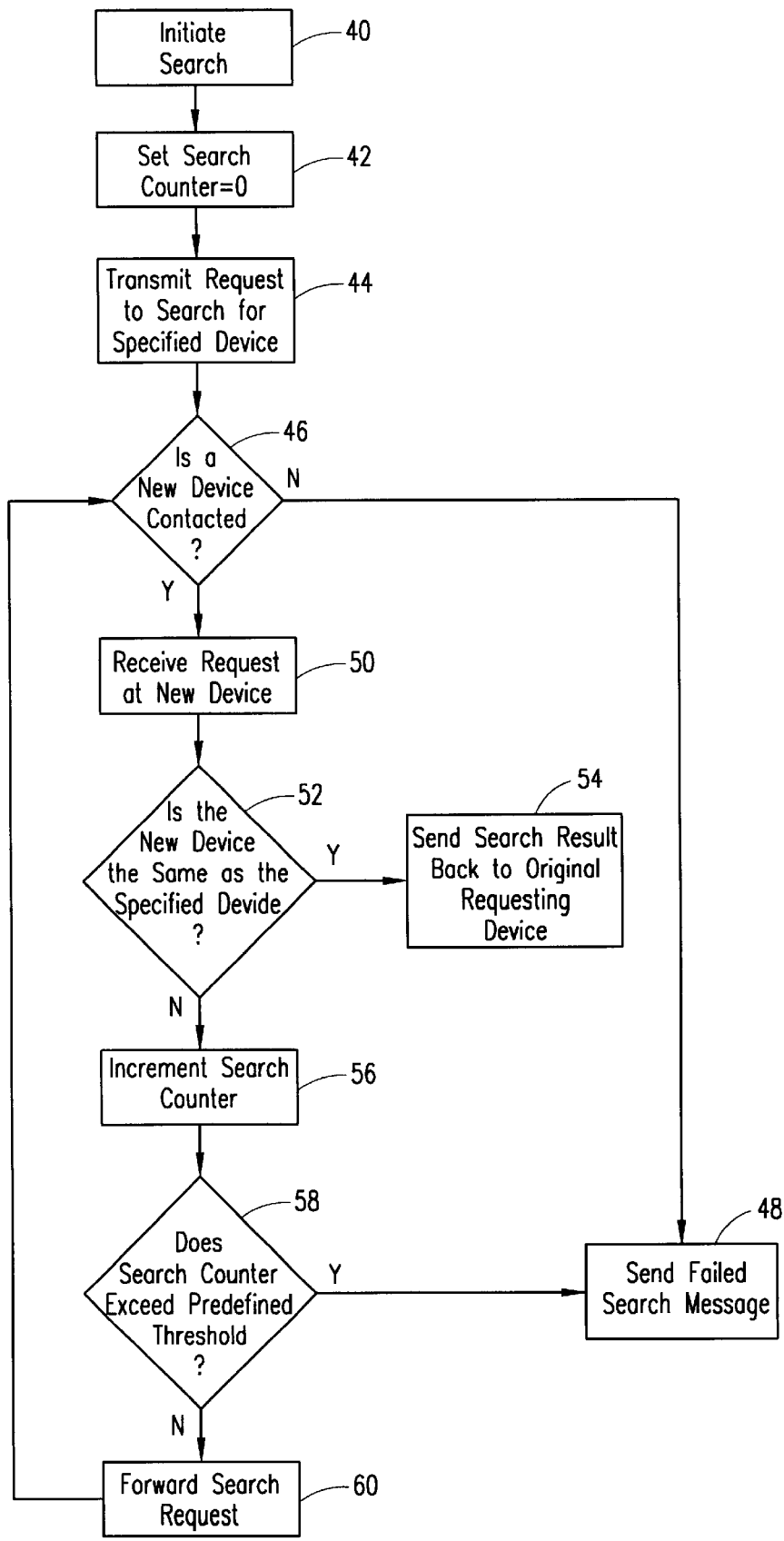
FIG. 2 is a flow diagram of the Bluetooth™ search procedure in accordance with a preferred embodiment of the present invention.

Referring now to FIG. 2, there is illustrated a flow diagram of the Bluetooth™ search procedure in accordance with a preferred embodiment of the present invention. In accordance with this embodiment, the number of Bluetooth™ devices in a search chain is limited either by the inability of the devices in the chain to locate any new Bluetooth™ devices or by the number of devices in the chain reaching or exceeding a predetermined maximum number of devices that are allowed to be in the chain. At step 40, a search for a particular Bluetooth™ device is initiated, and a search counter (e.g., as contained in the message 10 of FIG. 1) is set equal to zero at step 42. Next, at step 44, the electronic device from which the search is initiated transmits a request to search for the specified device via a Bluetooth™ radio interface.

It is then determined if the transmitted request is received by a new Bluetooth™ device at step 46. If not, then at step 48, a message communicating that the search has failed is sent back to the software module 6 that initiated the search. If, on the other hand, it is determined at step 46 that a new device can be contacted, the new device receives the search request at step 50. Based on profile information and/or a Bluetooth™ identity number contained within the request, it is then determined at step 52 if the new device is the device being sought. If so, a search result message is sent back up the chain to the original requesting device at step 54. The search result message serves to inform the requesting device that the device being sought has been located and to provide information from which the requesting device generates position data.

If, however, the new device is not the Bluetooth™ device being sought, the search counter is incremented at step 56, and at step 58, it is determined whether the search counter exceeds a predefined maximum threshold. If the search counter does exceed the threshold, a message indicating that the search failed is sent back up the chain to the original requesting device at step 48. If the search counter does not exceed the predefined threshold, then the search continues and the current device (i.e., the new device from the most recent iteration of steps 46, 50, and 52) forwards the search request via the Bluetooth™ radio interface at step 60 and the process returns to step 46. Accordingly, the search message is forwarded along one or more chains until either a maximum number of devices are included in the chain or the device being sought is located.

In accordance with the invention, the search area and the location of the sought-after device can be determined by the requesting device based on known locations of the Bluetooth™ devices in the chain. Alternatively, the search area can be expanded, contracted, or otherwise altered by the current location and/or movement of mobile devices that include a Bluetooth™ transceiver. Furthermore, the search can also be expanded by including Bluetooth™ devices in the chain that are unknown to the device from which the search originates. As a result, a location of the device being sought can be presented to the user in the form of a position relative to devices whose positions are known or in the form of a position relative to, or in the vicinity of a Bluetooth™ device whose position is unknown.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims. Furthermore, it shall be understood that the terms "comprises" and "comprising," when used in the foregoing Detailed Description and the following claims, specifies the presence of stated features, elements, steps, or components but does not preclude the presence or addition of one or more other features, elements, steps, components, or groups thereof.

What is claimed is:

1. A method for searching for objects using a wireless communications interface, comprising the steps of:

transmitting a search request for a specified device via a local wireless interface, said search request transmitted by a first device;

receiving the search request at a second device;

forwarding the search request to a new separate device via the local wireless interface;

determining whether the separate device comprises the specified device;

notifying the first device if the separate device comprises the specified device;

notifying the first device that the search failed if the separate device does not comprise the specified device and if the search request has been forwarded at least a predetermined number of times; and otherwise, repeating the steps of forwarding the search request and determining whether the new separate device comprises the specified device until one of the specified device is located and the search request has been forwarded at least said predetermined number of times.

* * * * *